Patented Oct. 27, 1925.

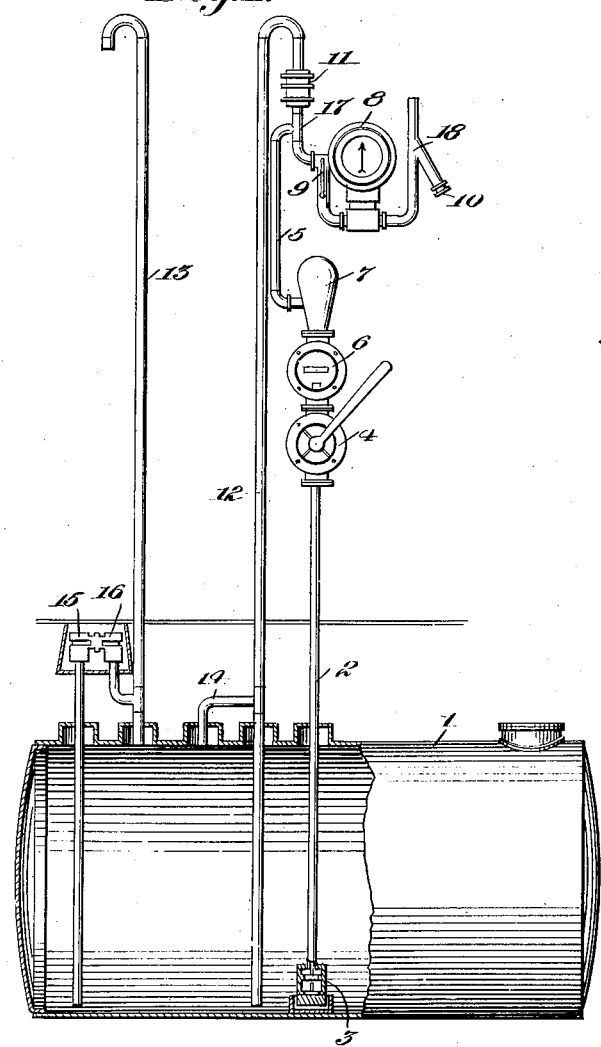

1,559,207

UNITED STATES PATENT OFFICE.

WILLEM CARL van RINGELENSTEIN AND THEODORUS RIEL, OF THE HAGUE, NETHERLANDS.

APPARATUS FOR DELIVERING MEASURED QUANTITIES OF LIQUID.

Application filed January 15, 1925. Serial No. 2,570.

*To all whom it may concern:*

Be it known that WILLEM CARL VAN RINGELENSTEIN and THEODORUS RIEL, both subjects of the Queen of the Netherlands, and both residing at The Hague, in the Kingdom of the Netherlands, have invented certain new and useful Improvements in Apparatus for Delivering Measured Quantities of Liquid, of which the following is a specification.

In apparatus for delivering measured quantities of a liquid which is pumped out of a low level container through a gauge, it is a common defect that imperfect closure of the non-return valve at the foot of the supply pipe allows liquid to flow back to the container, when the pump is at rest, and if the gauge used is one which responds to gas as well as to liquid the air or vapor which is pumped through it out of the empty or partially empty supply pipe causes a deficiency in the quantity of liquid delivered.

The object of our invention is to remove this defect. To this end we provide means whereby air entering the supply pipe in the circumstances hereinbefore referred to is deflected from the gauge during the operation of the pump, and passes away through an outlet which is closed automatically when the pump has re-filled the said pipe. The means used may include a float chamber containing a float, which allows air to traverse the chamber from an inlet to an outlet, but which closes the outlet when liquid follows the air. To avoid risk of injury to the pump or pipes, due to excessive pressure, a safety or relief device may be provided, whereby the outlet of the float chamber is automatically opened when the pressure attains a predetermined value. For example, the seat of the float valve may be a flap, which at a predetermined liquid pressure in the pipes opens a new path from the inlet to the outlet of the float chamber. Means may be provided for regulating the pressure at which this flap acts, as for example by adjusting the seat of a spring acting on the flap.

The float chamber is preferably located at the top of the delivery pipe from the pump, and at about the level of the top of the delivery pipe from the gauge the latter being in a kind of pocket of the pipe system.

An example of apparatus according to the invention is shown in the annexed drawings, in which—

Fig. 1 is an elevation, partly in section, and

Fig. 2 a vertical section, to a larger scale, of a float chamber forming part of the apparatus.

Figs. 3 and 4 are plan views of two parts within the float chamber.

In the drawing 1 represents a container for gasoline, 15 being a pipe for filling it, and 16 and 13 being respectively a steam pipe and air pipe associated therewith. The liquid is sucked from the container by means of a pump 4, through a pipe 2 having a foot valve 3. The pump delivers the liquid through a strainer 6 to a bulb 7 and pipe 5, the latter being connected by a T-union 17 to the inlet of the gauge 8, whose outlet is fitted with the air valve and has a branch pipe 18 joined to it level with the union 17. To the pipe 18, at 10, is joined the delivery pipe, leading to a tap. In the example shown there is a valve 9 at the gauge inlet, which is automatically closed when a predetermined quantity of liquid has been drawn off.

The vertical limb of the union 17 is connected at the top to the inlet of the float chamber 11, whose outlet is connected to a pipe 12, which extends nearly to the bottom of the container 1 and has a branch 14 terminating in the container above the liquid level.

When the valve 3 fully closes the suction pipe 2, the pipes 2 and 5 and the union leading to the gauge remain filled with liquid, when a portion of liquid has been drawn off, and the outlet also remains filled, up to the level of the branch pipe 18. The outlet from the float chamber then remains closed, and the air valve allows the pipe 10 to empty itself.

Assuming that 5 liters of gasoline are to be drawn off the pointer of the gauge is set at "5." The pump being put into operation, 5 liters are pumped through the gauge, whereupon the valve 9 is automatically closed, and the condition referred to above is established.

If the foot valve 3 does not close tightly, the pipes 5 and 2 gradually empty themselves, and the outlet of the float chamber is opened. The conduit between the union 17 and valve 9, and between the gauge 8 and branch pipe 18, remains full. When the pump is started again for delivering a measured quantity of liquid the air in the pipes 5 and 2 is first driven out by way of the float chamber 11 and pipes 12, 14 and 13, the resistance opposed to the flow of air along this path being less than resistance opposed by the meter. As soon as the liquid has risen in the pipes 2 and 5 sufficiently to close the outlet from the float chamber, by lifting the float, liquid is pumped through the gauge, and continues to flow till the valve 9 is automatically closed, which occurs when the exact quantity for which the meter is set had been delivered.

The float mechanism shown in Figs. 2, 3 and 4 has a casing 21 with an inlet 33 and outlet 34. The float 22 is vertically movable in relation to a rod 23 having fixed to it, above the float, a valve 24. The rod is guided at the bottom in a hole in a disc 26 having lugs 27 resting on a shoulder in the casing, and at the top the rod is guided by a spider within an aperture in a plate 25 having bosses 31 at the top and an annular seat 32 at the bottom for the valve 24. A coiled spring 28 bears upon the plate 25 with a thrust which can be regulated by means of a screwed ring 29 forming a seat for the spring at the top.

The action of this float mechanism is as follows:—

Air pumped into the casing under the conditions hereinbefore described flows through the gaps between the lugs 27, past the float and through the aperture in the plate 25 to the outlet 34. When liquid enters the casing and lifts the float the latter moves the valve 24 against its seat 32, thus preventing outflow of the liquid, but if the liquid pressure rises to an abnormal value, exceeding the pressure of the spring 28, the plate 25 is lifted and liquid can flow out. The bosses 31 prevent closure of the outlet by the lifted plate.

What we claim is:

1. Apparatus for delivering measured quantities of liquid having in combination with a pump, a low level liquid container, and a meter or gauge which registers the flow of liquid and gaseous fluids, a device, which affords an outlet for gaseous fluid from the pump conduit leading to the meter but which automatically closes said outlet when said conduit is filled with liquid, and means whereby the outlet is automatically opened when the liquid pressure in the conduit exceeds a predetermined value.

2. Apparatus for delivering measured quantities of liquid having in combination with a pump, a low level liquid container, and a meter or gauge which registers the flow of liquid and gaseous fluids, a device, which affords an outlet for gaseous fluid from the pump conduit leading to the meter but which automatically closes said outlet when said conduit is filled with liquid, and means whereby the outlet is automatically opened when the liquid pressure in the conduit exceeds a predetermined value, including a resiliently supported obstructing plate arranged to yield to such pressure.

3. Apparatus for delivering measured quantities of liquid having in combination with a pump, a low level liquid container, and a meter or gauge which registers the flow of liquid and gaseous fluids, a device, which affords an outlet for gaseous fluid from the pump conduit leading to the meter but which automatically closes said outlet when said conduit is filled with liquid, and means whereby the outlet is automatically opened when the liquid pressure in the conduit exceeds a predetermined value, including a resiliently supported obstructing plate arranged to yield to such pressure, the obstructing plate having an aperture and forming to seat for a valve which closes the outlet for liquid when the liquid pressure is below the critical pressure.

4. Apparatus for delivering measured quantities of liquid having in combination with a pump, a low level liquid container, and a meter or gauge which registers the flow of liquid and gaseous fluids, a device, which affords an outlet for gaseous fluid from the pump conduit leading to the meter but which automatically closes said outlet when said conduit is filled with liquid, and means whereby the outlet is automatically opened when the liquid pressure in the conduit exceeds a predetermined value, including a resiliently supported obstructing plate arranged to yield to such pressure, the obstructing plate being held by a spring having an adjustable seat, for regulating its pressure on the plate.

In testimony whereof, we have signed our names to this specification.

WILLEM CARL van RINGELENSTEIN.
THEODORUS RIEL.